United States Patent
Kim et al.

[11] Patent Number: 5,952,996
[45] Date of Patent: Sep. 14, 1999

[54] INFRARED POINTING TYPE WIRELESS CONTROLLER

[75] Inventors: Jeong-Yeol Kim, Kyungki-do; Duk-Chin Chwa, Seoul, both of Rep. of Korea

[73] Assignee: LG Electronics Inc., Seoul, Rep. of Korea

[21] Appl. No.: 08/678,032

[22] Filed: Jul. 10, 1996

[30] Foreign Application Priority Data

Jul. 10, 1995 [KR] Rep. of Korea ........................ 95-20225

[51] Int. Cl.$^6$ ........................................................ G09G 5/08
[52] U.S. Cl. ............................................ 345/158; 345/169
[58] Field of Search .................................. 345/158, 157, 345/156, 169; 348/734; 359/142, 143; 340/825.72

[56] References Cited

U.S. PATENT DOCUMENTS

| | | | |
|---|---|---|---|
| 5,045,843 | 9/1991 | Hansen | 345/158 |
| 5,561,543 | 10/1996 | Ogawa | 348/734 |
| 5,602,568 | 2/1997 | Kim | 345/158 |

*Primary Examiner*—Regina Liang
*Attorney, Agent, or Firm*—Loeb & Loeb

[57] ABSTRACT

An infrared pointing type wireless controller includes a system main body which is an objective of pointing, the system main body having transmitting circuit for generating a carrier frequency signal for emitting an infrared ray, and receiving and controlling circuit for receiving a reflected carrier signal and a reflected code signal, and calculating coordinates of a pointed position according to a difference of intensities of received infrared signals, for matching the pointed position to a display screen; and position indicating circuit with which pointing is performed having re-transmitting circuit for passing or blocking reflection of the carrier frequency signal transmitted from the transmitting circuit for generating a required code, and overlapping the code with the carrier frequency signal and reflecting the overlapped signal.

20 Claims, 6 Drawing Sheets

INFRARED POINTING TYPE WIRELESS CONTROLLER

BACKGROUND OF THE INVENTION

1. Field of the Invention

The present invention relates to a wireless controller, and more particularly, to an infrared pointing type wireless controller in which a carrier frequency signal for use in transmission of a signal is transmitted to a system main body which is an object of the pointing, a handset remote controller controls a reflection of the transmitted carrier frequency signal for producing a required code, and the main body receives a signal reflected from the handset remote controller for determining a pointed position according to intensities of the received signals.

2. Discussion of Related Art

FIGS. 1 through 3 illustrate a conventional infrared pointing type wireless controller as disclosed by the inventor under the same title as the present application in Korean Patent Application No. 92-12672. In particular, FIG. 1 schematically illustrates the conventional infrared pointing type wireless controller, FIG. 2 illustrates in detail the controller shown in FIG. 1, and FIG. 3 illustrates infrared sensors 21 through 21-3 located at four corners of a display screen.

As shown in FIG. 1, the conventional infrared pointing type wireless controller includes an infrared ray transmitting circuit 10 for transmitting infrared signals of a certain frequency, and a receiving and controlling circuit 20 for receiving the transmitted signals through receiving sensors 21~21-3 arranged at different positions on a display screen 11, calculating coordinates of a pointed position according to differences between intensities of the infrared signals received through each of the receiving sensors 21~21-3, and matching the pointed position with a position on the display screen 11.

The infrared ray transmitting circuit 10 includes a periodic pulse generator 12 for generating a remote control code signal in the form of periodic pulses by turning the switch SW on and off, a carrier signal generator 13 for generating a carrier signal, a current amplifier 14 for overlapping and amplifying the periodic pulses generated in the periodic pulse generator 12 and the carrier signal generated in the carrier signal generator 13, and infrared-emitting diodes 15 for transmitting the signal amplified by the current amplifier 14.

The receiving and controlling means 20 includes infrared ray receiving sensors 21~21-3 each arranged on the monitor screen 11 for receiving the signal transmitted from the infrared ray transmitting means 10, amplifying parts 22~22-3 for further amplifying the signals from the infrared ray receiving sensors 21~21-3, envelope detectors 23~23-3 for removing the carrier signal from the signals amplified by the amplifying parts 22~22-3 and for sensing an intensity level of the signal received by each of the infrared ray receiving sensors 21~21-3, a multiplexer 24, a sample-and-hold 25 and an analog-to-digital converter 26 connected in series for converting each of the intensity levels sensed by the envelope detectors 23~23-3 to digital data, a coordinate calculator 27 for receiving the digital data from the analog-to-digital converter 26 and for calculating coordinates of a position on the display screen 11 at which the infrared ray transmitting means 10 is pointed, a main processor 28 for matching the position on the display screen 11 to the calculated coordinates for displaying the point on the display screen 11 at which the infrared ray transmitting means 10 is pointed, and a control logic part 29 for providing timing signals necessary for operation of the receiving and controlling means 20. The infrared ray transmitting means 10 may be an infrared ray transmitter, such as a handset remote controller, and the receiving and controlling means 20 may be a system main body.

In the conventional infrared pointing type wireless controller having the aforementioned configuration, the infrared ray transmitting means 10 transmits an infrared signal toward a position on the display screen 11 having the infrared receiving sensors 21~21-3 mounted at four positions thereof. The intensity of the infrared signal as received by each of the infrared receiving sensors 21~21-3 is different.

More particularly, when the switch SW on the infrared ray transmitting means 10 is turned on, i.e., closed, the periodic pulse generator 12 generates periodic pulses until the switch SW is turned off, i.e., opened. These periodic pulses are overlapped by the carrier signal produced by the carrier signal generator 13 and amplified by the current amplifier 14. The current amplifier 14 sufficiently amplifies the overlapped periodic pulses and carrier signal to drive the infrared-emitting diodes 15 and thereby transmit the periodic pulses and the carrier signal as an overlapped infrared signal.

The infrared signal transmitted by the infrared-emitting diodes 15 is sensed by each of the infrared ray receiving sensors 21~21-3 in the receiving and controlling means 20. The outputs of the sensors 21~21-3 are then amplified by the amplifying parts 22~22-3.

The carrier signals are next removed from the signals amplified by the amplifying parts 22~22-3 by the envelope detectors 23~23-3. The resulting signals represent the intensities of the infrared signal as received by each of the infrared ray receiving sensors 21~21-3. Each of the intensity level signals is converted successively to digital data through the multiplexer 24, sample-and-hold 25, and analog-to-digital converter 26. From this digital data, the coordinate calculator 27 calculates coordinates on the display screen 11 at which the infrared ray transmitting means 10 is pointing at the present time. The coordinates calculated by the coordinate calculator 27 are entered into the main processor 28 which matches a point on the display screen 11 and the calculated coordinates and displays the present point on the screen 11.

Because the infrared ray transmitting means 10 is disposed in the handset remote controller, the foregoing conventional wireless controller generates the required carrier frequency signal and the remote control code signal in the handset remote controller itself and emits them by turning the infrared-emitting diodes 15 on and off. However, this process consumes a large amount of power, particularly in situations where two or more emitters are involved. As a result, the dry cell for the handset must be replaced frequently.

SUMMARY OF THE INVENTION

Accordingly, the present invention is directed to an infrared pointing type wireless controller that substantially obviates one or more of the problems due to limitations and disadvantages of the related art.

An object of the present invention is to provide an infrared pointing type wireless controller in which an infrared ray emitter is provided in a system main body for generating and transmitting of a transmission carrier frequency signal and an infrared ray from the main body, and means for indicating a position, such as a handset remote controller, for controlling a liquid crystal display (LCD) to block or pass the carrier frequency signal transmitted from the main body and generate a required remote control code signal, so that the main body receives a signal reflected through the LCD in the handset remote controller and determines a position pointed at by the handset remote controller according to the intensity of the received signal, wherein the handset remote controller only drives the LCD selectively and thereby reduces power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the infrared pointing type wireless controller includes a system main body which is an objective of pointing, having transmitting means for generating a carrier frequency signal for emitting an infrared ray, and receiving and controlling means for receiving a reflected carrier signal, and code signal, calculating coordinates of a pointed position according to a difference of intensities of received infrared signals, for matching the point to a display screen; and position indicating means with which pointing is performed, having re-transmitting means for passing or blocking reflection of the carrier frequency signal transmitted from the transmitting means for generating a required code, and overlapping the code with the carrier frequency signal and reflecting the overlapped signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings. In the drawings.

DETAILED DESCRIPTION OF THE PREFERRED EMBODIMENT

Reference will now be made in detail to the preferred embodiments of the present invention, examples of which are illustrated in the accompanying drawings.

Figure 4:
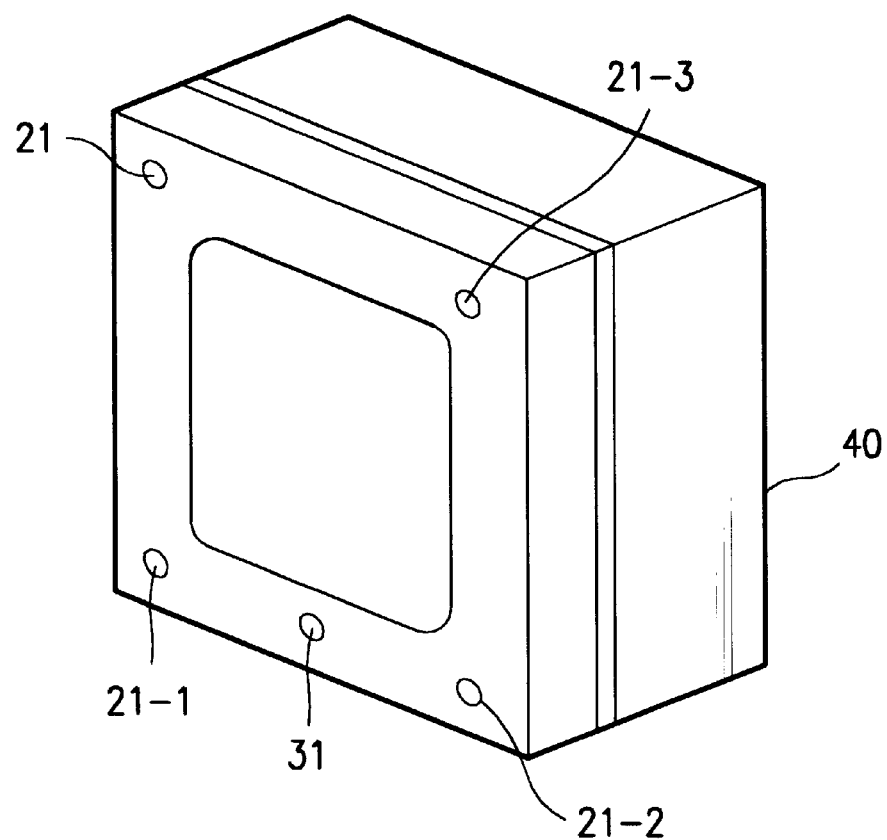
FIG. 4 is a perspective view of an arrangement of a main body of an infrared pointing type wireless controller in accordance with the present invention.

FIG. 4 illustrates a main body 40, which is an objective of pointing, of an infrared pointing type wireless controller in accordance with the present invention. The main body 40 includes an infrared ray transmitting part 31 and a plurality of infrared ray receiving sensors 21~21-3. While the number of infrared ray receiving sensors can be modified to suit a particular application of the invention, four infrared ray receiving sensors will be used in this preferred embodiment of the present invention. The main body also includes a display screen 11, such as a TV set.

Figure 5:
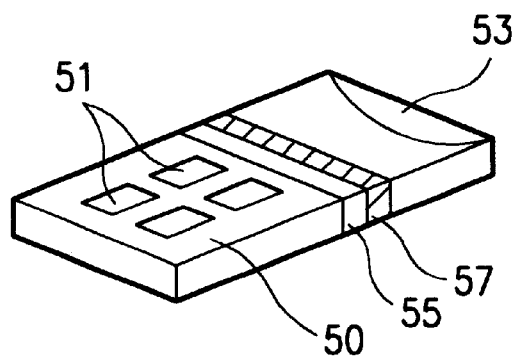
FIG. 5 is a perspective view of a handset in accordance with the present invention.

FIG. 5 illustrates a handset remote controller in accordance with the present invention. The handset remote controller includes a key applying part 51 having a plurality of keys for entering various functions, such as moving the cursor, selecting orders, operation orders and the like, a lens part 53 for focusing an infrared ray transmitted from the infrared ray transmitting part 31 of the main body 40 onto a reflector, a reflecting part 55 for reflecting the infrared ray focused on the reflector, and an LCD part 57 for blocking or passing the reflected infrared ray by means of electrical manipulation.

The lens part 53 may be optional. For example, when there is a necessity for focusing the infrared ray onto the reflector of the reflecting part 55, the lens part 53 is included, and when there is no such necessity, the lens part 53 may be omitted. The reflecting part 55 is preferably made of a material such as a mirror, which can completely reflect the infrared ray. The LCD part 57 controls whether the infrared ray reflected by the reflecting part 55 is transmitted again toward the main body 40 or is blocked.

Figure 6:
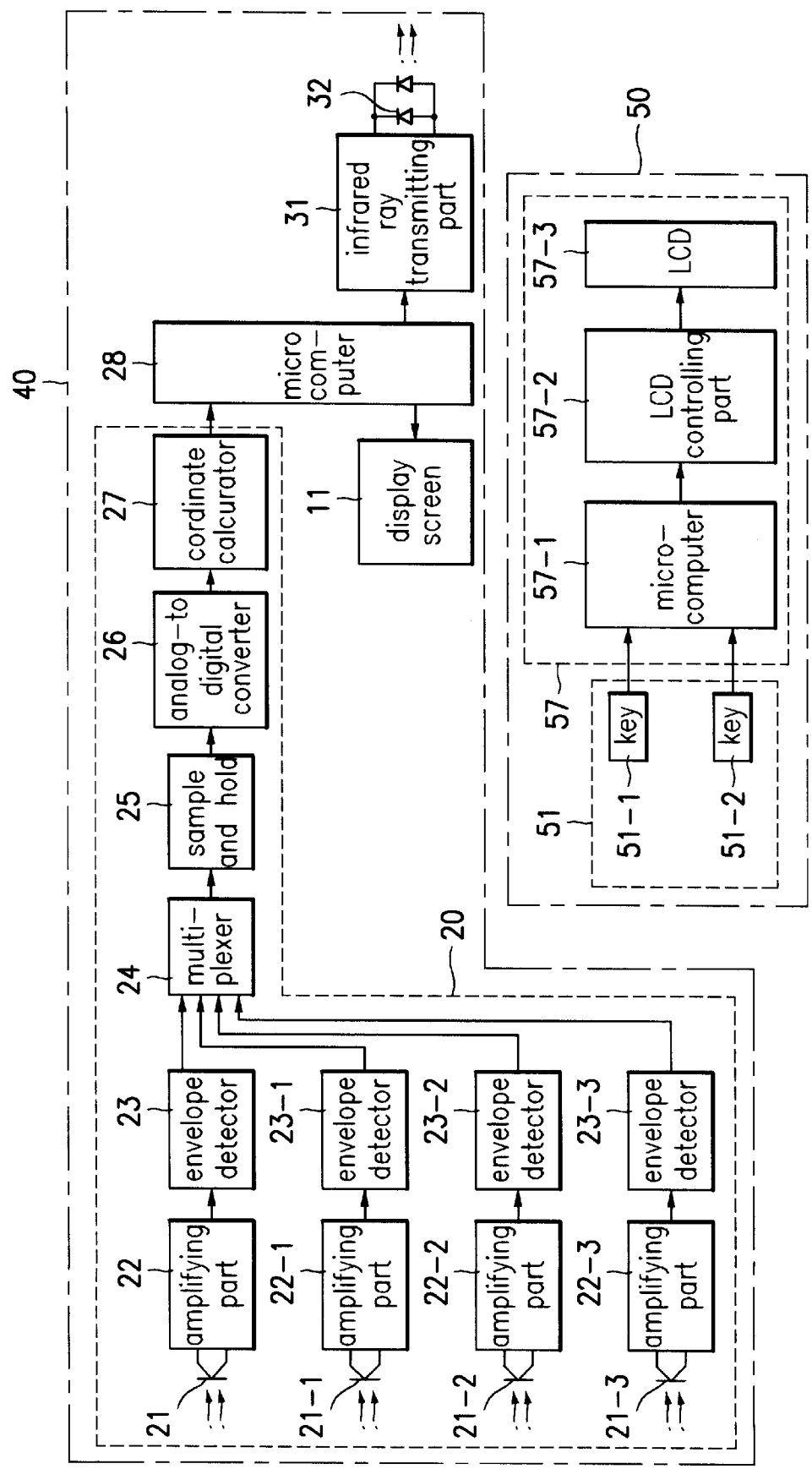
FIG. 6 is a block diagram of an infrared pointing type wireless controller in accordance with the present invention.

FIG. 6 illustrates a block diagram of the infrared pointing type wireless controller in accordance with the present invention. The infrared pointing type wireless controller includes the system main body 40 for generating and transmitting the carrier frequency signal at standby, receiving the carrier signal and code signal, reflected and coming back selectively, by the infrared ray receiving sensors 21~21-3, calculating coordinates of a pointed position according to a difference between the intensities of the received infrared signal at each of the sensors 21~21-3, for matching the coordinates with a point on the display screen 11; and means for indicating a position, such as handset remote controller 50, for selectively reflecting the carrier frequency signal transmitted from the system main body 40 to generate a code for a remote controlling function.

The system main body 40 includes receiving and controlling means 20 for receiving the reflected carrier signal and code signal and calculating coordinates of the pointed position, a microcomputer 28 for matching the calculated coordinates and the display screen 11 for displaying the present point on the screen, and an infrared ray transmitting part 31 for generating the carrier frequency signal under the control of the microcomputer 28 and transmitting an infrared ray through infrared emitting diodes 32.

Figure 1:
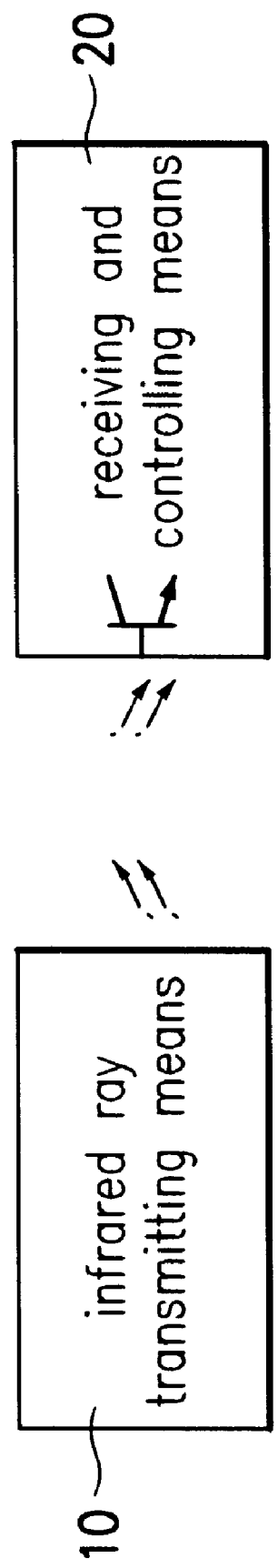
FIG. 1 is a simple block diagram of a conventional infrared pointing type wireless controller.
Figure 2:
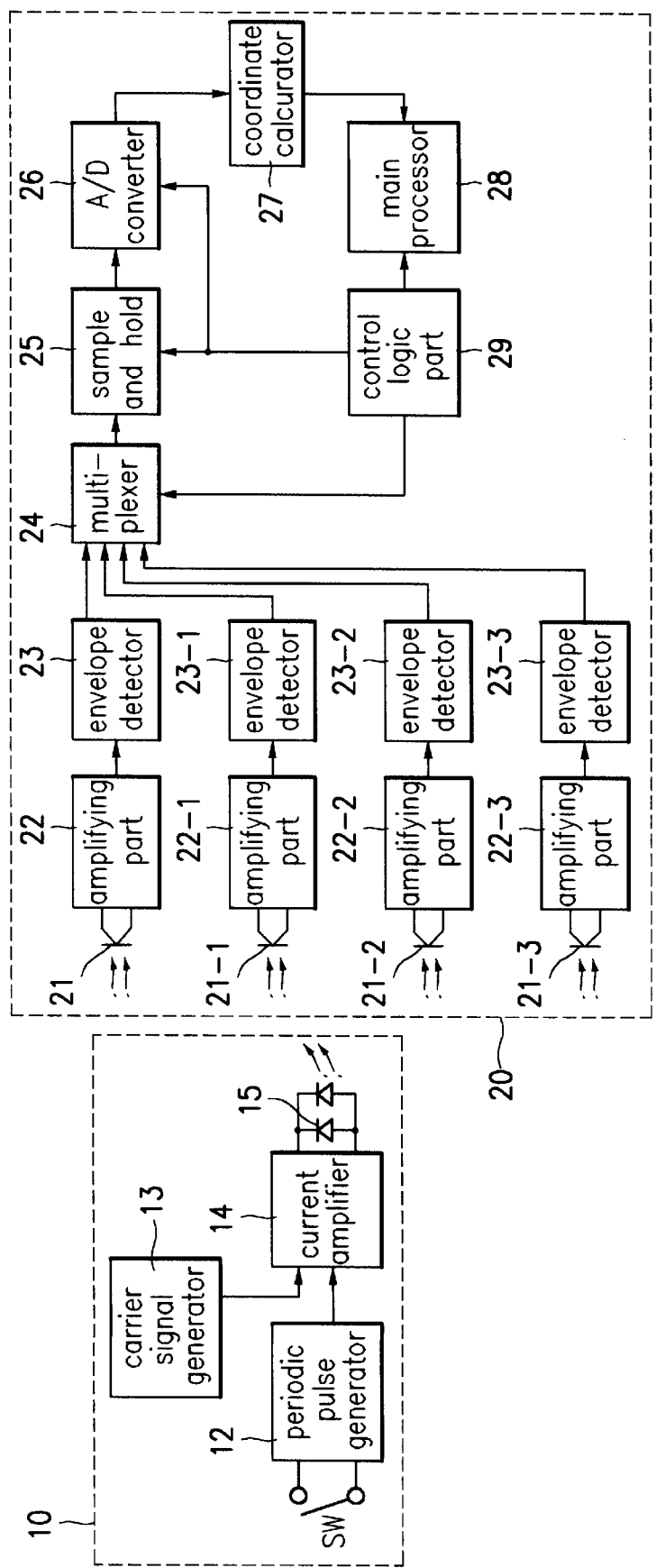
FIG. 2 is a detailed block diagram of the conventional infrared pointing type wireless controller of FIG. 1.
Figure 3:
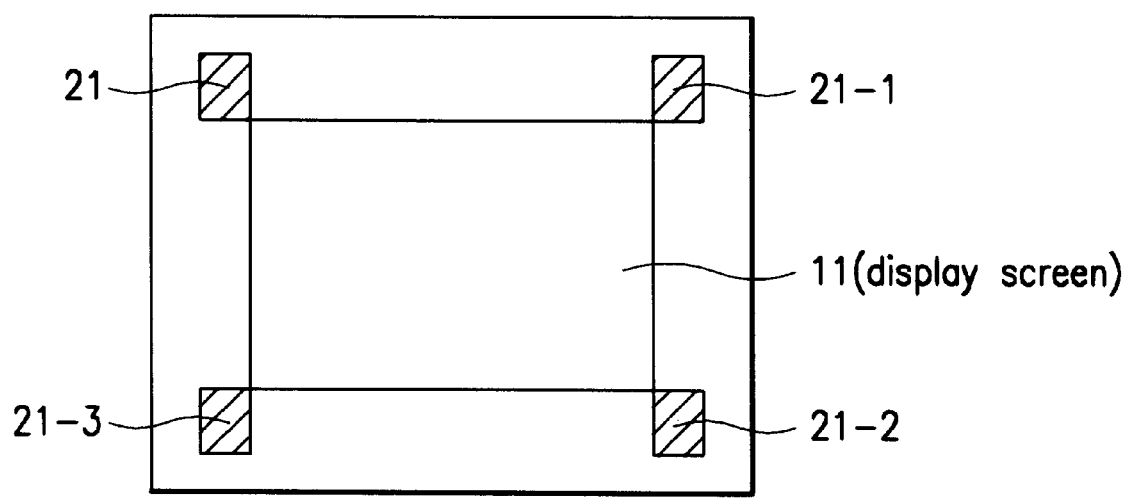
FIG. 3 is a conventional arrangement of infrared ray receiving sensors on a monitor screen.

The receiving and controlling means 20, which can be the same as the receiving and controlling means 20 shown in FIG. 2, includes a plurality of infrared ray receiving sensors 21~21-3 for receiving the carrier signal and the code signal reflected at the handset remote controller 50, amplifying parts 22~22-3 for amplifying the signals from the infrared ray receiving sensors 21~21-3, envelope detectors 23~23-3 for removing the carrier signal received in the amplifying parts 22~22-3, and sensing a level of the light intensity received in the infrared ray receiving sensors 21~21-3, a multiplexer 24, a sample-and-hold 25 and an analog-to-digital converter 26 connected in series for conversion of each of the levels of the light intensity from the envelope detectors 23~23-3 to a digital data, and a coordinate calculator 27 for receiving an output from the analog-to-digital converter 26 for calculating coordinates of the position on the display screen 11 pointed at the present time.

The LCD part 57 of the handset remote controller 50 includes an LCD 57-3 for blocking or passing reflection of the infrared ray, a microcomputer 57-1 for generating a control signal in response to a key signal, such as cursor movement, selecting orders, operation orders and the like, from the key applying part 51, and an LCD controlling part 57-2 for turning the LCD 57-3 on and off to generate a code signal.

The microcomputer 57-1 stores codes for different functions provided by the key applying part 51, and transmits a code for each of the functions to the LCD controlling part 57-2 for controlling shunting of the LCD 57-3 and thereby controlling the reflection of the infrared ray.

In the infrared pointing type wireless controller of the present invention having the aforementioned configuration, during standby of the system, a carrier frequency signal is generated in the infrared ray transmitting part 31 in the system main body 40 and transmitted as an infrared ray by the infrared emitting diodes 32.

The lens part 53 in the handset remote controller 50 focuses the infrared ray transmitted from the system main body 40 onto the reflecting part 55, and the reflecting part 55 completely reflects the infrared ray.

In this case, the infrared signal transmitted from the system main body 40 only includes the carrier signal, and does not include a code signal for performing a certain function. Therefore, when a certain function, such as moving the cursor, selecting orders, operation orders and the like, is required, the user operates a corresponding one of the keys 51-1~51-2 of the key applying part 51 on the handset remote controller 50.

Upon application of the corresponding key on the key applying part 51 for conducting a user desired function, the microcomputer 57-1 controls the LCD to generate a code signal corresponding to the function, which provides the same effect as an iris opening and shutting in a camera. That is, as the handset remote controller 50 reflects the infrared ray transmitted from the system main body 40 through the reflecting part 55 by blocking or passing reflection of the infrared ray by turning the LCD 57-3 on and off using the LCD controlling part 57-2, the microcomputer 57-1 generates a code signal meeting the corresponding function. This code signal is overlapped with the carrier frequency signal. If no key is entered from the handset remote controller 50, the handset remote controller 50 reflects the carrier frequency signal transmitted from the system main body 40 unchanged.

Figure 7A:
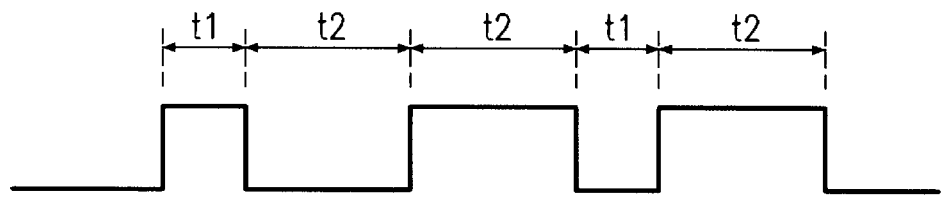
FIGS. 7a through 7d are waveform diagrams for different parts of an infrared pointing type wireless controller in accordance with the present invention.
Figure 7B:
Figure 7C:
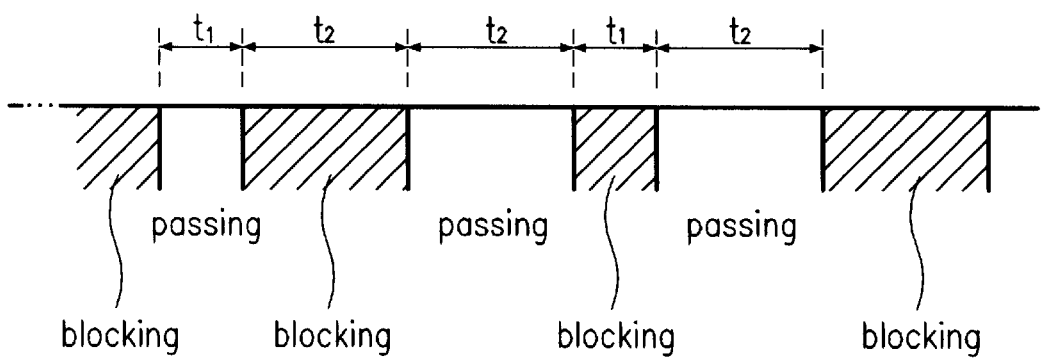
Figure 7D:
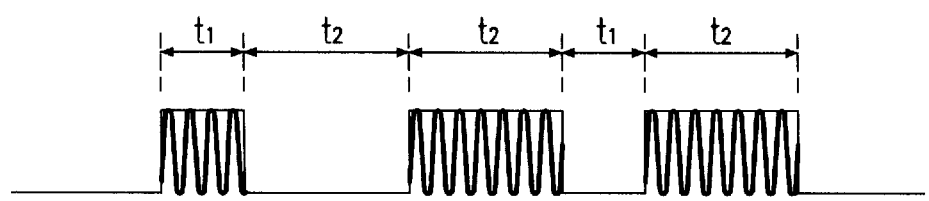

Accordingly, when the waveform shown in FIG. 7a is assumed to be a code signal for conducting a certain function according to a key application on the key applying part 51 and the waveform shown in FIG. 7b is assumed to be an infrared ray (carrier frequency signal) transmitted from the system main body 40, the infrared ray as shown in FIG. 7b is passed as shown in FIG. 7c during a high portion shown in FIG. 7a and blocked during a low portion under the control of the microcomputer 57-1 and the LCD controlling part 57-2, to thereby generate a desired overlapped signal as shown in FIG. 7d. That is, when the LCD 57-3 is in a blocking state, as the infrared ray reflected at the reflecting part 55 cannot pass through the LCD 57-3, the receiving and controlling means 20 in the system main body 40 cannot receive the infrared ray, and the signal at the low state shown in FIG. 7d is generated. On the other hand, when the LCD 57-3 is in a passing state, the infrared ray reflected at the reflecting part 55 is held for a desired duration and the signal at a high state as shown in FIG. 7d is generated.

During the passing state of the LCD 57-3 in the handset remote controller 50, each of the infrared ray receiving sensors 21~21-3 of the receiving part 20 in the system main body 40 receives the infrared ray including the carrier signal and the code signal overlapped. Since the infrared signal sensed by the infrared ray receiving sensors 21~21-3 is weak, the outputs of the infrared ray receiving sensors 21~21-3 are amplified by respective amplifying parts 22~22-3 and each of the carrier signals is removed by respective envelope detectors 23~23-3. The resulting signals represent intensities of the infrared signal as received by respective ones of the infrared ray receiving sensors 21~21-3.

The intensity level signals are converted into digital data in succession through the multiplexer 24, sample-and-hold 25 and the analog-to-digital converter 26. From this digital data, the coordinate calculator 27 generates coordinates of a position on the display screen 11 at which the handset remote controller 50 is pointing.

The coordinates of the position calculated by the coordinate calculator 27 are applied to the microcomputer 28 for matching a point on the display screen 11 and the calculated position coordinates and displaying the present point on the screen 11.

As has been explained above, by adopting to generate and transmit a carrier signal from the main body and adopting the handset to control reflection of the signal to produce a code for the signal and re-transmit the produced code to the main body, the handset only controls the operation of the LCD. Accordingly, the power consumption of the handset can be reduced approximately below 1% compared to the conventional device. Therefore, the present invention is very favorable to the handset remote controller that has a great burden of power consumption, such as the pointing type device.

The infrared pointing type wireless controller in accordance with the present invention facilitates a reduction of power consumption to a minimum. The present invention accomplishes this by devising the infrared ray transmitting part provided in the main body to generate and transmit a transmission carrier frequency signal; by devising the handset remote controller to control the LCD to pass or block reflection of the carrier frequency signal for generating a required code signal and overlap the code signal with the carrier frequency signal and transmit the overlapped signal; and by devising the main body to receive the signal reflected through the LCD in the handset remote controller, determine the position pointed by the handset remote controller according to the intensity of received signal, and move the cursor on the display screen to the determined position. The result is that the handset remote controller only operates the LCD selectively.

It will be apparent to those skilled in the art that various modifications and variations can be made in method for fabricating semiconductor device of the present invention without departing from the spirit or scope of the invention. For example, the present invention is applicable not only to pointing type wireless controllers, but also to general existing wireless controllers. Thus, it is intended that the present invention cover the modifications and variations of this invention provided they come within the scope of the appended claims and their equivalents.

What is claimed is:

1. An infrared pointing type wireless controller comprising:
   a system main body which is an objective of a pointing, the system main body including,
      transmitting means for generating a carrier frequency signal and transmitting the carrier frequency signal as an infrared ray, and
      receiving and controlling means for receiving a reflected overlapped signal, calculating coordinates of a pointed position according to a difference between intensities of the received reflected overlapped signal, and matching the pointed position with a display screen position; and
   position indicating means with which the pointing is performed, the position indicating means including re-transmitting means for passing or blocking a reflection of the carrier frequency signal transmitted by the transmitting means, generating a code signal, overlapping the code signal with the carrier frequency signal to produce the overlapped signal, and reflecting the overlapped signal.

2. An infrared pointing type wireless controller as claimed in claim 1, wherein the receiving and controlling means includes:
   a plurality of infrared ray receiving sensors each for receiving the overlapped signal reflected by the re-transmitting means;
   a plurality of amplifying parts connected to respective ones of the plurality of infrared ray receiving sensors, each of the amplifying parts amplifying the overlapped signal received by the respective infrared ray receiving sensor;
   a plurality of envelope detectors connected to respective ones of the plurality of amplifying parts, each of the envelope detectors removing the carrier signal from the overlapped signal amplified by the respective amplifying part and sensing an intensity level of the overlapped signal amplified by the respective amplifying part;
   a multiplexer, a sample-and-hold, and an analog-to-digital converter connected in series for converting each of the intensity levels sensed by the envelope detectors to digital data;
   a coordinate calculator for calculating from the digital data the coordinates of the pointed position; and
   a microcomputer for matching the pointed position with the display screen position and for controlling the generation of the carrier frequency signal by the transmitting means.

3. An infrared pointing type wireless controller as claimed in claim 1, wherein the re-transmitting means includes:
   a key applying part having a plurality of keys for entering various required functions;
   a reflector for completely reflecting the overlapped signal transmitted by the transmitting means;
   a liquid crystal display for blocking or passing the overlapped signal reflected by the reflector to generate the code signal, overlap the code signal with the carrier frequency signal to provide the overlapped signal, and transmit the overlapped signal;
   a microcomputer for storing codes corresponding to respective functions to generate the code signal in accordance with a key signal from the key applying part; and
   a liquid crystal display controller for turning the liquid crystal display on and off under control of the microcomputer.

4. An infrared pointing type wireless controller as claimed in claim 1, wherein the position indicating means further includes a lens configured to focus the carrier frequency signal at the re-transmitting means.

5. An infrared pointing type wireless controller as claimed in claim 3, wherein a lens part is provided with the reflector when focusing of the carrier frequency signal at the reflector is required.

6. A wireless controller comprising:
   a system main body including:
      carrier frequency signal generating means for generating a carrier frequency signal, overlapped signal receiving means for receiving an overlapped signal, a display screen, intensity detecting means for detecting intensities of the overlapped signal received by the overlapping signal receiving means, and a position determining means; and
   a remote controller including code signal generating means for generating a code signal and overlapped signal producing means for producing the overlapped signal by superimposing the code signal onto the carrier frequency signal, wherein from the detected intensities, the position determining means determines a position on the display screen at which the remote controlled is pointed, wherein the overlapped signal producing means includes:
      a reflector; and
      exposing means for selectively exposing the reflector to the carrier frequency signal in accordance with the code signal.

7. A wireless controller as claimed in claim 6, wherein the exposing means includes a liquid crystal display.

8. A wireless controller as claimed in claim 6, wherein the overlapped signal receiving means receives the overlapped signal from the reflector.

9. A wireless controller as claimed in claim 6, wherein the overlapped signal receiving means includes a plurality of sensors and the intensity detecting means detects the intensities of the overlapped signal at each of the plurality of sensors.

10. A wireless controller as claimed in claim 6, wherein the remote controller further includes a lens for focusing the carrier frequency signal toward the reflector.

11. A wireless controller as claimed in claim 6, wherein the code signal generating means includes a microcomputer.

12. A wireless controller as claimed in claim 11, wherein the remote controller further includes a keypad and wherein the microcomputer generates the code signal in accordance with the operation of the keypad.

13. A wireless controller comprising:
   a system main body including carrier frequency signal generating means for generating a carrier frequency signal, overlapped signal receiving means for receiving a reflected overlapped signal, a display screen, intensity detecting means for detecting intensities of the overlapped signal received by the overlapped signal receiving means, and a position determining means; and
   a remote controller including code signal generating means for generating a code signal and overlapped signal producing means for producing the reflected overlapped signal by superimposing the code signal onto the carrier frequency signal, wherein from the detected intensities, the position determining means determines a position on the display screen at which the remote controller is pointed, wherein the overlapped signal producing means includes:
      a reflector; and exposing means for selectively exposing the reflector to the carrier frequency signal in accordance with the code signal.

14. A wireless controller as claimed in claim 13, wherein the exposing means includes a liquid crystal display.

15. A wireless controller as claimed in claim 13, wherein the overlapped signal receiving means receives the overlapped signal from the reflector.

16. A wireless controller as claimed in claim 13, wherein the overlapped signal receiving means includes a plurality of sensors and the intensity detecting means detects the intensities of the overlapped signal at each of the plurality of sensors.

17. A wireless controller as claimed in claim 16, wherein the plurality of sensors are disposed about a periphery of the display screen.

18. A wireless controller as claimed in claim 16, wherein the position determining means determines the position on the display screen at which the remote controller is pointed by analyzing differences between the intensities of the overlapped signal detected at each of the plurality of sensors by the intensity detecting means.

19. A wireless controller as claimed in claim 16, wherein the intensity detecting means includes a plurality of envelope detectors corresponding to the plurality of sensors.

20. A wireless controller as claimed in claim 13, wherein the remote controller further includes a lens for focusing the carrier frequency signal toward the reflector.

* * * * *